United States Patent Office 3,492,346
Patented Jan. 27, 1970

3,492,346
PROCESS FOR THE PREPARATION OF TEREPHTHALIC ACID FROM ALKALI TEREPHTHALATES
Seiji Uno and Toshimasa Shimizu, Iwakuni-shi, Japan, assignors to Teijin Limited, Osaka, Japan, a corporation of Japan
No Drawing. Filed Nov. 24, 1964, Ser. No. 413,605
Claims priority, application Japan, Nov. 28, 1963, 38/63,510
Int. Cl. C07c 63/26
U.S. Cl. 260—515                      7 Claims

ABSTRACT OF THE DISCLOSURE

Method for the preparation of terephthalic acid comprising reacting an alkali terephthalate with phthalic anhydride in an aqueous reaction medium whereby the phthalic anhydride in a molten state is fed into the aqueous medium in such a manner that it forms finely dispersed particles in the reaction medium.

---

This invention relates to a process for the preparation of terephthalic acid from alkali terephthalates. More particularly, this invention relates to a process which comprises reacting an alkali terephthalate with phthalic anhydride in an aqueous reaction medium, characterized in that the said phthalic anhydride in a molten state is fed into the aqueous medium in such a manner that it forms finely dispersed particles in the said medium.

It has already been known to prepare alkali salt of terephthalic acid or alkali salt of 1,3,5-benzenetricarboxylic acid by reacting an alkali salt of phthalic acid or of benzoic acid at an elevated temperature in a gaseous atmosphere of carbon dioxide. The industrially advantageous recovery of alkali in these reaction products and its recycling to the process are of much importance. Among various methods known as useful for such recovery, a method of producing terephthalic acid and alkali salt of phthalic acid which comprises reacting alkali terephthalate with phthalic anhydride (or phthalic acid) is considered to be industrially advantageous.

Heretofore, this kind of reaction has been carried out batchwise. The reaction is carried out by feeding a specified amount of alkali terephthalate and phthalic anhydride in the form of flakes or powder.

However, in a batchwise operation also, it is necessary to shorten the reaction time as much as possible from the industrial standpoint. When a continuous method is employed, it is particularly required to increase the reaction rate. In order to increase the reaction rate, it is necessary to increase the contact area of solid and liquid. This involves the necessity of making the said phthalic anhydride into fine powder. Consequently, the procedure becomes complicated and solid impurities are likely to come in. The purity of the obtained terephthalic acid thus tends to be lowered. Furthermore, when the said reaction is carried out continuously, the feeding material should be precisely controlled in feeding it into a reaction vessel. However, industrially, the precise control of the feed rate of powder is very difficult because of difficulty of quantitative transfer as compared with liquid or gas. Therefore, while the reaction should be continuously carried out in a manner such that alkali terephthalate and said aromatic carboxylic acid have a specified mole ratio, when the said aromatic carboxylic acid is fed in the form of flakes or powder, the process is industrially very disadvantageous because of lack of quantitativity and controllability.

Furthermore, if solid impurities are present in the material aromatic carboxylic acid, it is difficult to separate and remove them. The impurities are thus contained in a terephthalic acid, a reaction product. The production of high purity terephthalic acid is thus impeded. After extensive researches, we have reached the present invention which can overcome the above-mentioned defects.

In accordance with the present invention, phthalic anhydrid in the molten state is fed into an aqueous solution of dialkali terephthalate or in an aqueous suspension of monoalkali terephthalate in such a manner that it forms finely dispersed particles in the said aqueous solution or suspension.

In order that molten phthalic anhydride may form finely dispersed particles in an aqueous medium such as an aqueous solution of said dialkali salt or an aqueous suspension of monoalkali salt, it is sufficient to provide a feed opening for the said molten phthalic anhydride outside the said aqueous medium system and feed the molten phthalic anhydride from the said feed opening into the said aqueous medium in the form of liquid jet. The provision of a stream stabilizer at the said feed opening is favorable for the formation of a liquid jet.

Specific conditions for the formation of finely dispersed particles by feeding the molten phthalic anhydride in the form of a liquid jet into the said aqueous medium system may be decided experimentally. The most important condition for the formation of dispersed particles is to feed the said molten phthalic anhydride in the form of a liquid jet into an aqueous medium. According to the research of the inventors, it has been found that the desired dispersed particles can be advantageously obtained if the said phthalic anhydride is fed into the aqueous medium under further conditions such that the equivalent diameter of the feed opening is adjusted within the range of 0.2 to 20 mm., a linear velocity of the liquid at the opening is 1.5–20 m./sec., and that the jet number of the flow of the molten phthalic anhydride should be within the range of 0.25–400, said jet number being calculated in accordance with the formula below:

$$Je = \left(\frac{\gamma_g \cdot v^2 \cdot D}{\sigma \cdot g}\right)\left(\frac{\gamma}{\gamma_g}\right)^{0.45}$$

in which:
$Je$ represents jet number (dimensionless),
$\gamma_g$ stands for the density (kc./m.$^3$) of the liquid around the stream of the molten phthalic anhydride,
$v$ stands for the linear velocity (m./sec.) of the stream of the molten phthalic anhydride,
$D$ stands for the equivalent diameter (m.) of the feed opening,
$\gamma$ stands for the density (kg./m.$^3$) of the molten phthalic anhydride, and
$\sigma$ stands for the surface tension (kg./m.) of the molten phthalic anhydride.

In accordance with the present invention, in the above formula $\gamma_g$ is roughly 1.1 kg./m.$^3$, $\gamma$ is about $1.20 \times 10^3$ kg./m.$^3$, and $\sigma$ is about $5.0 \times 10^{-3}$ kg./m. The $D$ in the above formula is an equivalent diameter of the feed opening for the molten phthalic anhydride, and it is a value represented by the following formula: (Quotient obtained by division of a cross sectional area of liquid by a wet periphery) $\times 4$.

Therefore, when the feed opening is a circular tube, the said $D$ is represented by $$\left(\frac{\pi d^2}{4} / \pi d\right) \times 4$$

(where $d$ is an inside diameter of the circular tube). Thus, $D$ is $d$.

When stream stabilizers are provided in the feed opening, it is sufficient that the said conditions are satisfied for every opening (thin pore) partitioned by many stream stabilizers.

When molten phthalic anhydride is directly fed into the said aqueous medium by an ordinary procedure, it is solidified in the liquid and formed into blocks. The reaction rate is therefore much retarded. In the extreme case, it becomes impossible to continue reaction. Furthermore, when molten phthalic anhydride is fed from a feed opening provided outside the aqueous medium system in a slow stream such as not to form a liquid jet, it invites unfavorable results as mentioned above. When the velocity of the stream of said molten phthalic anhydride becomes larger and phthalic anhydride is fed in the spray form, the amount of phthalic anhydride sublimated is excessively enhanced. This becomes a cause of various troubles. Furthermore, when the pressure for the formation of the stream of molten phthalic anhydride becomes too high, surrounding air may be entrained into the reaction liquid. Therefore vigorous foaming occurs. For these reasons, it is most preferable to feed molten phthalic anhydride into the said aqueous medium under the conditions in the range where the said jet number, the equivalent diameter of the feed opening and the flow velocity of the liquid are satisfied.

Additionally, in the present invention, it is preferable to heat the aqueous medium to a temperature of at least 50° C. and in particular to that of 80–100° C. The reason for this is that by so doing it is possible to further increase the rate at which alkali terephthalate is reacted with phthalic anhydride and to prevent the foamed monopotassium phthalate from precipitating on exceeding the solubility. In accordance with the present invention, as molten phthalic anhydride is fed into an aqueous medium in such a manner that it forms finely dispersed particles in the aqueous reaction medium, the rate at which the material dialkali salt or monoalkali salt is reacted with phthalic anhydride becomes very high as compared with the conventional method in which phthalic anhydride is fed in the form of flakes or powder. Furthermore, as phthalic anhydride is fed into the reaction system in the molten state in accordance with the present invention, there is no likelihood that solid impurities come in, whereas in the prior art process, they are prone to come in when the material is made into flakes or powder. Even if solid impurities come in, they can easily be removed by filtering the molten phthalic anhydride prior to being fed into a reaction vessel.

Furthermore, in accordance with the present invention, phthalic anhydride is fed into the reaction system in a fluid, and so it is possible to feed it quantitatively into the reaction system and to control the reaction.

The present invention further has a big advantage that reaction may be carried out at atmospheric pressure.

Provided with these advantages, the process of the present invention is especially suitable for continuous operation.

The present invention is further illustrated by the following examples which in no way limit the present invention.

EXAMPLE 1

Two 80-litre stirred tanks arranged in series were maintained at a temperature of 90° C., and into the first stirred tanks, 15 wt. percent of a slurry of monopotassium terephthalate was fed continuously at a rate of 120 kg./hr. Simultaneously, molten phthalic anhydride of 150° C., was passed through a 200 mesh screen and fed from an orifice was 0.6 mm. $\phi$. The fed amount was so regulated that the pH in the tank might be 3.7. At this time, the molten phthalic anhydride passed through the orifice at a rate of about 12 m./sec., and $Je$ was about 47. It was conjectured from another experiment that the specific surface area of the solid phthalic anhydride formed in the reaction liquid was about $1.0 \times 10^2$ m.$^2$/kg.

The reaction mixture was made to overflow continuously from the first tank to the second tank, and the reaction liquid which overflowed the second tank was filtered. The obtained terephthalic acid was washed with about twice the amount of hot water and filtered. After drying, there was obtained a terephthalic acid in high purity at a rate of 14.2 kg./hr. Potassium in the dried terephthalic acid was 20 p.p.m.

EXAMPLE 2

2.3 kg. of dipotassium terephthalate were put into 80 kg. of water in a stirred tank, dissolved by heating and stirring and thereafter maintained at a temperature of 90° C. Phthalic anhydride was molten in a storage tank and maintained at a temperature of 153° C. It was then transferred by a Miltonroy pump and extruded through an orifice having a diameter of 0.4 mm. into an aqueous solution of dipotassium terephthalate present in the said stirred tank in a period of 10 minutes. At this time, the phthalic anhydride was passed through the orifice at a velocity of 18.8 m./sec., and $Je$ was 73.8. The reaction liquid was further stirred while maintaining the temperature at 90° C. and in one hour it was filtered. The dried cake was 1.53 kg. of terephthalic acid. In this procedure, a 200 mesh stainless steel screen was provided between the orifice and the Miltonroy pump. Solid impurities in the phthalic anhydride were removed by filtration through the screen.

EXAMPLE 3

20 wt. percent of a slurry of monopotassium terephthalate was continuously fed into two 4 m.$^3$ stirred tanks arranged in series and maintained at a temperature of 80° C. At the same time, molten phthalic anhydride was continuously fed into the said reaction tanks at a rate of 3.84 m./sec. through the orifice with 8 mm. $\phi$ at a feed ratio of 835 kg./hr. The feed rate of the slurry of monopotassium terephthalate was regulated so that the pH of the reaction liquid in the first tank might be 3.8. A stainless steel stream stabilizer having a thickness of 0.2 mm. and a length of 10 mm. was provided in the orifice in parallel with the flow and the orifice was divided into four equal sections. At this time, the equivalent diameter of each section partitioned by a stream stabilizer in the orifice was 3.5 mm. and $Je$ was 27. The reaction liquid which overflowed the second reaction tank was filtered and the obtained terephthalic acid was washed with hot water in an amount about 0.8 time the terephthalic acid. The potassium present in the terephthalic acid of high purity obtained after drying was 23 p.p.m.

EXAMPLE 4

The same procedures as in Example 2 were repeated except that disodium terephthalate was used in place of dipotassium terephthalate. There was obtained about 1.5 kg. of terephthalic acid.

EXAMPLE 5

With the view to getting information about the particle size of the finely divided phthalic anhydride prepared in accordance with the method of this invention, molten phthalic anhydride was fed into water of 50° C. from the orifice provided at a position about 30 cm. above the water surface. The obtained finely divided phthalic anhydride was filtered and separated. The specific surface area was measured by the Lea-Nurse method. Results are shown in the following table.

| No. | Diameter of orifice (mm.) | Rate of flow (m./sec.) | $Je$ (dimensionless) | Specific surface area (m.$^2$/kg.) | Stream stabilizer |
|---|---|---|---|---|---|
| 1 | 1.5 | 3 | 7.0 | $0.5 \times 10^2$ | Not Provided. |
| 2 | 0.35 | 5 | 4.6 | $1.02 \times 10^2$ | Do. |
| 3 | 0.35 | 20.0 | 73 | $1.07 \times 10^2$ | Do. |
| 4 | 0.6 | 15.5 | 75 | $0.80 \times 10^2$ | Do. |
| 5 | 1.04 | 23.0 | 290 | $0.85 \times 10^2$ | Do. |
| 6 | 5.0 | 14.7 | 560 | $0.98 \times 10^2$ | Do. |
| 7 | 8.0 | 3.8 | 60 | $0.9 \times 10^2$ | Do. |
| 8 | 8.0 | 3.8 | 27 | $0.85 \times 10^2$ | Provided. |

In the case of No. 5 mentioned above, a phenomenon of vigorous foaming was observed, and in the case of No. 6, there was a considerable amount of sublimation. No. 7 and No. 8 are different from each other merely in the presence or absence of a stream stabilizer, but in No. 8 the liquid jet was more stabilized.

Control 1

The method heretofore practiced in which phthalic anhydride is fed in the form of commercially available flakes was compared with the method of this invention. 1.8 kg. of 20 wt. percent slurry of monopotassium terephthalate were put in a 2-litre stirred tank and maintained at a temperature of 90° C. Then, 261 g. of the commercially available flaky phthalic anhydride were put thereinto. The time required for the completion of the reaction was about 10 minutes. On the other hand, when 261 g. of finely divided phthalic anhydride obtained in No. 4 of Example 4 were put in, the reaction completed in 15 seconds.

Prior to the reaction, it was confirmed that the finely divided phthalic anhydride was not hydrolyzed. The time required for the completion of the reaction is the time required until there was no appreciable change in the pH of the reaction liquid.

We claim:

1. A process for the preparation of terephthalic acid which comprises reacting an alkali terephthalate with phthalic anhydride in an aqueous reaction medium at atmospheric pressure, characterized in that the said phthalic anhydride in a molten state is fed into the aqueous medium from a feed opening having an equivalent diameter of 0.2–20 mm., which is provided outside the aqueous reaction system, at the linear velocity at the feed opening of 1.5–20 m./sec. under such conditions that the jet number ($Je$) of the stream of the molten phthalic anhydride should be within the range of 0.25–400, said jet number being calculated in accordance with the formula below $$Je = \left(\frac{\gamma_g \cdot v^2 \cdot D}{\sigma \cdot g}\right)\left(\frac{\gamma}{\gamma_g}\right)^{0.45}$$

in which:

$Je$ represents jet number (dimensionless), $\gamma_g$ stands for the density (kg./m.$^3$) of the liquid around the stream of the molten phthalic anhydride, $v$ stands for the linear velocity (m./sec.) of the stream of the molten phthalic anhydride, $D$ stands for the equivalent diameter (m.) of the feed opening, $\gamma$ stands for the density (kg./m.$^3$) of the molten phthalic anhydride, and $\sigma$ stands for the surface tension (kg./m.) of the molten phthalic anhydride.

2. The process as set forth in claim 1 in which the alkali terephthalate is a monoalkali terephthalate.

3. The process as set forth in claim 1 in which the alkali terephthalate is a dialkali terephthalate.

4. The process as set forth in claim 1 in which the aqueous medium containing the alkali terephthalate is heated to at least 50° C.

5. The process as set forth in claim 1 in which the stream of the molten phthalic anhydride is stabilized by a stream stabilizer having at least one plane parallel to the direction of the said stream, which is provided at the feed opening of the molten phthalic anhydride.

6. The process as set forth in claim 1 in which the reaction is performed under atmospheric pressure.

7. The process as set forth in claim 1 in which the process is performed continuously.

References Cited

UNITED STATES PATENTS

| | | | |
|---|---|---|---|
| 2,333,368 | 11/1943 | Gaskill | 260—515 |
| 2,905,709 | 9/1959 | Schenk et al. | 260—515 |
| 3,243,457 | 3/1966 | Agate et al. | 260—515 |

JAMES A. PATTEN, Primary Examiner